United States Patent [19]

Groh et al.

[11] 4,098,940

[45] Jul. 4, 1978

[54] THERMOPLASTICS SHEETS OR COMPOSITE SHEETS WITH OPTICAL INHOMOGENEITIES

[75] Inventors: Rudolf Groh, Burgkirchen, Alz; Gustav Meinel, Burghausen, Salzach, both of Fed. Rep. of Germany

[73] Assignee: Hoechst Aktiengesellschaft, Frankfurt am Main, Fed. Rep. of Germany

[21] Appl. No.: 719,193

[22] Filed: Aug. 31, 1976

[30] Foreign Application Priority Data

Sep. 3, 1975 [DE] Fed. Rep. of Germany ....... 2539163

[51] Int. Cl.² .................. B42D 15/00; B32B 7/00; A44C 3/00
[52] U.S. Cl. ..................... 428/218; 40/2.2; 283/7; 283/8 R; 428/213; 428/500; 428/522; 428/915
[58] Field of Search ............... 428/195, 212, 213, 218, 428/518, 166, 522, 500, 915; 40/2.2; 283/8 R, 7, 8 B

[56] References Cited

U.S. PATENT DOCUMENTS

| | | | |
|---|---|---|---|
| 3,412,493 | 11/1968 | French | 283/8 R |
| 3,610,120 | 10/1971 | Morse et al. | 283/8 R X |
| 3,655,494 | 4/1972 | Buzzell | 283/7 X |
| 3,679,448 | 7/1972 | Tramposch | 283/8 R X |
| 3,679,449 | 7/1972 | Nagot et al. | 283/8 R X |
| 3,919,447 | 11/1975 | Kilmer et al. | 283/8 R X |
| 3,961,956 | 6/1976 | Fukuda et al. | 283/8 R X |

*Primary Examiner*—Thomas J. Herbert, Jr.
*Assistant Examiner*—R. Eugene Varndell, Jr.
*Attorney, Agent, or Firm*—Connolly and Hutz

[57] ABSTRACT

The present invention is related to a sheet or a composite sheet made of transparent thermoplastics with optical inhomogeneities according to a desired and reproducible pattern, which are not discernible with an unaided eye, and which produce polarization-optical patterns when placed in a polarization-optical arrangement. The invention is further related to a process for the manufacture of such a sheet or composite sheet and to their use for the manufacture of counterfeit-proof official documents.

10 Claims, No Drawings

THERMOPLASTICS SHEETS OR COMPOSITE SHEETS WITH OPTICAL INHOMOGENEITIES

The present invention is related to sheets or composite sheets of translucent thermoplastic compositions with optical inhomogeneities, which yield polarization-optical patterns due to a polarization-optical arrangement. The invention is also related to a process for the manufacture of such sheets or composite sheets, which optical inhomogeneities in the sheet and in the composite sheet form a desired and reproducible pattern. The invention is further related to the use of such sheets or composite sheets for the manufacture of counterfeit-proof articles.

Articles which represent a certain value, such as official documents, legal tender or other so-called securities, should guarantee that counterfeiting or forgery is made as difficult as possible, whilst such falsifications are detectable as easily and as promptly as possible.

Recently thermoplastic sheets are utilized more and more for the manufacture of such articles, e.g. identity-card, checque cards, credit cards etc. Most frequently employed are especially composite sheets which can either form compounds of several sheets of this kind or with other materials carying specific information either printed, inscribed or coated with e.g. paper, photos, magnetic layer carriers; these compounds may also contain metal sheets, either covering the whole surface or stripes only.

It is a known practice to impart better counterfeit-proof properties by printing patterns which are difficult to imitate and by applying certain special printing inks. It is also a known practice to mark the print carrier by means of watermarks or dyed fibers. These latter methods are not applicable especially to plastic sheets, since e.g. the conventional incorporation of fibers into paper, encounters flowing problems etc.; furthermore, a partially unevenly tinted substrate is often undesirable due to the fact that the good visibility under poor lighting conditions and the aesthetic quality of the imprint are not satisfactory. Moreover, marks, which are visible without any special auxiliary methods, are easily discernible by a potential counterfeiter, a factor which diminishes the protective efficiency and reduces the possibility to catdh red-handed the user of a forged document or legal tender.

There may also be other reasons for recommending to mark thermoplastic sheets or articles manufactured therefrom at a temperature below the second order transition temperature, in a way which hides these marks to an unaided eye; one of these reasons may be, that the manufacturer of such articles may want to mark the same in case of potential complaints so as to be sure whether they come really from his own production line or whether the claimed articles have been manufactured elsewhere, and that these marks must not cause any visible inconveniences on the commodity such as imprints, embossings, etc.

So as to apply watermark-like patterns on polyvinyl chloride sheets or sheets made of similar plastics, a process is known which provides a method for preparing a sheet either by molding or rolling, for guiding this sheet prior to stretching at normal pressure over a roll heated to a temperature above the softening point of the plastic material, the circumference of this roll carrying a slightly elaborated profile according to the desired pattern (German Pat. No. 890,712). After being guided over the heated roll, the shiny all-over surface of the sheet shows duller parts according to the pattern profile, due to the different heat transfer from the flat or profiled surface areas.

This process is inconvenient, for the marks are visible to the unaided eye and disappear entirely or partially — depending on the work-up conditions — during the thermoplastic processing of such sheets. It is especially unsuitable to the manufacture of checque cards, credit cards or identity cards with unconspicuous marks.

It is also known, that optical inhomogeneities may occur in thermoplastic sheets which result from stress and/or molecular orientation, generally due to the process for preparing these sheets, and that polarization-optical patterns become visible, if such transparent, i.e. translucent sheets are placed in a polarization-optical arrangement (Review "Gummi-Asbest-Kunststoffe", No. 8, 1972, pages 724 to 730). These patterns — as compared to the watermarks being prepared by embossing as aforedescribed — are advantageous insofar that they can be made visible in a polarization-optical arrangement only, but they are not very suitable to mark in the above mentioned sense, since hazardous factors in the processing may considerably modify the position and shape of these marks, so that they are not exactly reproducible, thus being no longer counterfeit-proof.

Object of the present invention is now the manufacture of a thermoplastic sheet or composite sheet having patterns which are not discernible for the unaided eye and thus, to a large extent, counterfeit-proof.

This purpose of the invention is fulfilled by means of a sheet or composite sheet made of translucent thermoplastic molding composition having optical inhomogeneities, which yield, in case of a polarization-optical arrangement, polarization-optical patterns, sheet or composite sheet wherein the optical inhomogeneities occur according to a desired and reproducible pattern.

A process for the manufacture of the sheets or composite sheets according to the present invention comprises producing thicker spots in a thermoplastic sheet at a temperature within the liquid-viscous temperature range of the plastic material, these thicker spots forming a desired pattern, and submitting the patterned sheet, optionally together with at least one further sheet, to compression at a temperature within the rubber-elastic temperature range of the plastic material, in order to straighten out the thicker spots for producing optical inhomogeneities.

The thicker spots in the sheet have to be produced under conditions such that in the sheets remains no stress at all or only a slight one. This purpose is fulfilled by keeping the temperature within the liquid-viscous temperature range of the plastic sheet material during the manufacture of the thicker spots. This temperature range — as well as the second order transition temperature and the subsequent rubber-elastic temperature range — is characteristic for the various thermoplastic materials and described by the specific literature (cf. e.g. "Die Physik der Hochpolymeren", $4^{th}$ vol. by H. A. Stuart, springer Verlag, Berlin 1956, pages 16 to 19, or "Polymer Handbook", $2^{nd}$ edit., by J. Brandrup, E. H. Immergut, Verlag Wiley-Interscience, New York). According to these descriptions, the thicker spots e.g. in a polyvinyl chloride sheet, free from plasticizer and heat-resistant, are produced at a temperature of from about 160° to 250° C, preferably from 190° to 230° C, and in a sheet made of non-crystal polystyrene these thickner spots are produced at from 170° to 250° C, preferably from 190° to 230° C.

The thicker spots may be produced, for example, during the manufacture of a sheet web. If the sheet web is manufactured by a calendering process, the thicker spots may be produced, for example, by fitting the (two)final calender roll(s) with appropriate recesses. The sheet web passing over this (these) roll(s) at a temperature usually situated within the liquid-viscous temperature range of the plastic material of the sheet, absorbs the recess pattern of the roll(s) and maintains this pattern while passing the subsequent cooling and winding devices. The two final calender rolls of the calendering device of a polyvinyl-chloride rigid sheet have e.g. a temperature of generally from 180° to 210° C, so that the sheet web passing over these calender rolls is also heated to this same temperature.

When preparing a sheet web by extrusion, thicker spots in the sheet may be produced e.g. by fitting the nozzle orifice with suitable recesses.

If the sheets are manufactured discontinuously in a pressing device from the raw material mixture, a pregranulate or a preliminary sheet, e.g. a rough sheet, one or both of the cauls are fitted with recesses forming the pattern sought for.

The thicker spots, which are produced in the sheet according to a certain desired pattern, may protrude from the sheet surface by at least 5%, in respect to the sheet thickness, measuring absolutely at least 5 $\mu$m, preferably from 20 to 300 $\mu$m.

The additional sheets which are utilized for preparing a composite sheet, may have the same composition as the original sheet. But, it is as well possible to employ for this purpose sheets of a different composition, if those are suitable to the purpose of the invention. Especially the performance under heat has to be similiar, i.e. the liquid-viscous and the rubber-elastic temperature range should be identical or similar.

Rolling out the produced thicker spots serves the purpose to achieve in the sheet or composite sheet stress and/or molecular orientation. This rolling-out step is carried out at a temperature situated within the rubber-elastic temperature range of the plastic material, most advantageously at a temperature slightly above the second order transition temperature of the plastic sheet material. Consequently, a sheet made of polyvinyl chloride (second order transition temperature 75° C), free from plasticizer and heat-resistant, carrying a pattern with thicker spots, is molded at a temperature of from 80° to 150° C, preferably from 120° to 140° C, and a sheet made of non-crystal polystyrene (second order transition temperature 85° C) is molded at from 90° to 150° C, preferably at 110° to 130° C. The compression is most usefully carried out with the molding devices usually applied for processing plastic material. Due to rolling out the thicker-spots-pattern, inhomogeneities are formed in the sheet according to said pattern.

A further process for preparing the sheet or composite sheet according to the invention comprises molding at least one thermoplastic sheet together with a lattice area, which gates are conform to the pattern definitely sought for, at a temperature keeping within the rubber-elastic temperature range of the plastic material, to yield a sheet or a composite sheet with a smooth surface.

In order to manufacture a composite sheet, two or several sheets (basic sheets) are compressed together with a lattice area (lattice sheet). Basic sheet and lattice sheet consist preferably of the same thermoplastic material.

However, basic sheet and lattice sheet may also consist of different material, if patterns become thus feasable which are not discernible to the unaided eye. To this purpose, especially the optical and thermal properties have to be similar, i.e. such plastics have to be combined which have a similar or identical liquid-viscous and rubber-elastic temperature range and which refractive indices are similar.

The lattice area which is to be processed according to the invention, may be stamped out in predetermined patterns from the surface of a thermoplastic sheet or prepared by molding injection. The lattice area (lattice sheet) must have a thickness surpassing at least by 5% the thickness of the sheet(s) to be molded with, absolute measurement: protruding from the surface by at least 5 $\mu$m, preferably by about 40 $\mu$m to 400 $\mu$m.

The appearance of the lattice area may be chosen freely, as well as the arrangement of the thicker spots. There may be produced, for example, geometrical patterns, such as circles, ellipses, triangles, quadrangles or polygonals, crosses, lozenges or wavy lines, floral patterns, letters, numbers and other graphical designs. Preference is given to endlessly repeated patterns.

The compression of basic sheet(s) and lattice area, which may be carried out in conventional pressing devices, serves the same purpose (build-up of stress, molecular orientation) and is carried out at the same temperature, at which the compression of thicker-spots-patterns is performed. The most advantageous temperature at which the compression of basic sheet(s) and lattice area is thus carried out, is therefore situated slightly above the second order transition temperature of the plastic material of the sheet. When being compressed, the basic sheet(s) and the lattice sheet are welded together and the pattern of the lattice area is transmitted onto the basic sheet as optical inhomogeneity. If the basic sheet and the lattice sheet are made of e.g. polyvinyl chloride materials, the compression is carried out at a temperature of from 80° to 150° C, preferably from 120° to 140° C. The compression as such may be performed in conventional pressing devices.

Suitable materials for preparing the sheets or composite sheets according to the invention are those essentially non-crystal thermoplastics, which may be processed according to the usual processes, such as extrusion, calendering, molding or compression to yield sheets.

The following polymers may be employed as sheet material according to the invention:

Polystyrene, its copolymers and graft polymers with acrylonitrile, butadiene, acrylic acid ester and methacrylic acid ester, like methylmethacrylate, butylacrylate; polyvinyl chloride, its copolymers and graft polymers with vinyl esters of straight-chain or branched carboxylic acids having from 2 to 20, preferably from 2 to 4 carbon atoms, such as vinyl acetate, vinyl propionate, vinyl stearate; vinyl ethers; acrylic acid esters and methacrylic acid esters, such as butyl acrylate, methyl methacrylate; N-cyclohexyl maleimide; acrylonitrile; styrene; olefins such as ethylene, propylene; diolefins such as butadiene, vinylhalides such as vinylidene fluoride, vinylidene chloride; unsaturated acids, such as fumaric acid, maleic acid, acrylic acid, methacrylic acid; and their monoesters or diesters with monoalcohols or dialcohols having from 1 to 10 carbon atoms;

N-substituted maleimides. The copolymers may also contain mixtures of corresponding monomers.

For submitting to graft polymerization with vinyl chloride, there may be utilized e.g. elastomer polymers, which had been obtained by polymerization of one or several of the following monomers: dienes such as butadiene, cyclopentadiene; olefins such as ethylene, propylene; styrene, unsaturated acids such as acrylic acid or methacrylic acid as well as their esters with monoalcohols or dialcohols having from 1 to 10 carbon atoms, acrylonitrile, vinyl compounds such as vinyl esters of straight-chain or branched carboxylic acids having from 2 to 20, preferably from 2 to 4 carbon atoms, vinyl halides, such as vinyl chloride, vinylidene chloride.

Further examples are polyacrylic acid ester, polymethacrylic acid ester, polyvinyl ester, polyamides, polyesters, polycarbonates, thermoplastic cellulose esters such as cellulose acetobutyrate, polyvinylidene halides, such as polyvinylidene chloride, polyolefins such as polyethylene or propylene, thermoplastic polyurethanes, etc.

Especially suitable are homopolymers of vinyl chloride or styrene, as well as copolymers or graft copolymers of vinyl chloride or styrene with at least 60 weight %, preferably 85 weight %, calculated on polymer, of polymerized vinyl chloride or styrene units.

There may be added to thermoplastics various materials which facilitate the processing, such as stabilizers against the influence of heat, light and oxidation, e.g. organotin stabilizers, urea and thiourea as well as their derivatives, alkali earth metal salts, as well as tin, barium, cadmium or lead salts with aliphatic carboxylic acids or oxycarboxylic acids, optionally together with alkyl-substituted aromatic hydroxyl compounds, such as ditertiary butyl paracresol, dibutyl hydroxy naphthalene or tertiary butyl hydroxyanisol, lubricants such as stearic acid, montanic acid, glycerinmonooleate, bisstearyl ethylene diamine or bis-palmitoyl ethylene diamine, montanic acid ester of ethane diol or 1,3-butane diol; furthermore soluble dyestuffs, optical brighteners, pigments and further useful additives. The only criterion common to all such additives is a sufficient transparency of the sheets or composite sheets being prepared according to the invention. This quality is essential for the polarization-optical arrangement to produce distinctly visible patterns. The thermoplastic material or thermoplastic sheets to be utilized are most advantageously free from plasticizers. On the other hand, they may principally contain plasticizers, too, however in that case the plasticizer content may be limited to such an extent that the optical inhomogeneities according to the invention remain still feasible. This object is achieved, in general, by plasticizer portions of up to 10 weight %, preferably up to 5 weight %, calculated on the plastic material.

The thickness of the sheet or composite sheet according to the invention may vary within a wide range, most usefully from 75 $\mu$m, to 2000 $\mu$m, preferably from 150 $\mu$m to 1000 $\mu$m.

The process according to the invention yields sheets or composite sheets, which have a perfectly even aspect when being observed with the unaided eye, which, however, produce a neatly shaped pattern of the flattened thicker spots or of the compressed lattice area, if they are placed between crossed polarization filters (polarizer, analyzer) — regardless whether transmittted light or reflected light is used. In the latter case non-transulucent substrates do not interfere, provided that they allow for a sufficient light reflexion at the phase interface between sheet and substrate.

Marking sheets or composite sheets as well as consumer goods made therefrom — as described by the invention — is especially advantageous, since these marks can be made discernible quickly and by simple means as often as wanted and without interference with other qualities of the consumer article. Moreover, the chosen marking pattern is easily reproducible.

The sheets or composite sheets according to the invention may be utilized wherever unconspicuously marked sheets are needed, e.g. for the manufacture of information carriers, especially of checque cards, credit cards, identity cards as well as official documents and other securities. They are also suitable as components of compounds with other sheets and/or paper.

The invention is illustrated by the following examples:

EXAMPLE 1

A mixture of a transparent rigid-PVC-sheet which consists essentially of suspension-PVC having a K-value of 60 and which is stabilized with octyl-tin, is pre-gelatinized over mixing rolls (roll temperature 150° C). The plasticized mass is then transferred onto a four-rolls-calendering device, the final roll carrying on a certain area of the roll surface lozenge-shaped recesses engraved 0.2 mm deep and 1 mm wide. On the calendar, the four rolls of which (following the material flow) are heated to 180° C, 190° C, 195° C and 200° C, a sheet 200 $\mu$m thick is manufactured, which is removed from the last calender roll, cooled in the usual manner by means of cooling rolls and finally wound up. The recess pattern on the roll surface of the last calender roll are forming lozenge-shaped thicker spots in the sheet.

The sheet samples containing the lozenge-shaped thicker spots are compressed on a heatable laboratory-scaled pressing device at a temperature of 140° C between tin plates with high-polish finish, so that the thicker spots are flattened out and the sheet does not preserve any thicker spots after the compression (pressure during compression: 100 kg/cm$^2$). The compressed sheet does not show any pattern discernible to the unaided eye. However, when placed between tow crossed polarization filters (polarizer - analyzer), the pattern present in the compressed sheet as thicker spots is clearly discernible again by means of bright-dark-differences.

EXAMPLE 2

A pattern, shaped as a square-latticed surface, is stamped out of a piece of rigid PVC sheet (suspension-PVC having a K-value of 60) being 200 $\mu$m thick and transparent. The lattice-surface is placed onto a 300 $\mu$m thick sheet of identical composition (basic sheet) and compressed together with this basic sheet at 140° C in a pressing device consisting of high-polish cauls (compression pressure 100 kg/cm$^2$), so that the basic sheet and the lattice-surface are melting to form together one evenly thick sheet. This sheet does not show any pattern discernible to the unaided eye. However, when placing this sheet between two polarization filters (polarizer-analyzer), the square-shaped pattern of the original lattice-surface is clearly recognizible by bright-dark-differences.

We claim:

1. Transparent sheet consisting of a vinyl chloride or styrene polymer, said sheet having optical inhomogeneities which become visible as optical patterns when the sheet is placed between two crossed polarization filters, said optical inhomogeneities being obtained by producing in said sheet thicker spots according to a desired pattern, which spots protrude from the sheet surface 20 to 300 μm at a temperature within the liquid-viscous range of the polymer, and subjecting the patterned sheet to compression at a temperature within the rubber-elastic range to obtain a smooth sheet for achieving optical inhomogeneities.

2. Counterfeit-proof documents containing a sheet according to claim 1.

3. Information carriers consisting of a sheet according to claim 1.

4. Compounds of various sheets, which contain a sheet according to claim 1.

5. Compounds of sheets and paper containing a sheet according to claim 1.

6. Transparent sheet consisting of a vinyl chloride or styrene polymer, said sheet having optical inhomogeneities which become visible as optical patterns when the sheet is placed between two crossed polarization filters, said optical inhomogeneities being produced by compressing the sheet together with a latticed sheet of a homopolymer of vinyl chloride or a copolymer thereof with at least 85 weight percent, calculated on the polymer of polymerized vinyl chloride, said latticed sheet having a thickness surpassing at least by 5% the thickness of the sheet to be compressed with it and having projections according to a predetermed pattern, said compression being carried out at a temperature within the rubber-elastic temperature range of the polymer to thereby obtain a smooth sheet in which the pattern of the lattice is transmitted as optical inhomogeneities.

7. Counterfeit-proof documents containing a sheet according to claim 6.

8. Information carriers consisting of a sheet according to claim 6.

9. Compounds of various sheets which contain a sheet according to claim 6.

10. Compounds of sheets and paper containing a sheet according to claim 6.

* * * * *